United States Patent [19]

Nidiffer

[11] Patent Number: 4,971,259
[45] Date of Patent: Nov. 20, 1990

[54] DUAL HOPPER COFFEE GRINDER

[75] Inventor: Charles A. Nidiffer, Decatur, Ill.

[73] Assignee: Bunn-O-Matic Corporation, Springfield, Ill.

[21] Appl. No.: 61,724

[22] Filed: Jun. 15, 1987

[51] Int. Cl.⁵ .............................................. A47J 42/50
[52] U.S. Cl. ...................................... 241/34; 241/100
[58] Field of Search ................... 99/286; 241/100, 34, 241/63, 101.2, 101 D, 248, 224, 225, 101.6, 186.2, 64, 135

[56] References Cited

U.S. PATENT DOCUMENTS

| | | |
|---|---|---|
| 1,608,718 | 11/1926 | Boyle et al. ...................... 241/100 X |
| 2,827,845 | 3/1958 | Richeson . |
| 3,053,168 | 9/1962 | Mills . |
| 3,153,377 | 10/1964 | Bosak . |
| 3,739,709 | 6/1973 | Herbsthofer et al. . |
| 4,607,200 | 8/1986 | Zimmerman . |

FOREIGN PATENT DOCUMENTS

| | | |
|---|---|---|
| 509864 | 10/1930 | Fed. Rep. of Germany ...... 241/100 |
| 436085 | 3/1912 | France ................................. 241/100 |

Primary Examiner—Mark Rosenbaum
Attorney, Agent, or Firm—Richard Bushnell

[57] ABSTRACT

A coffee grinder in which coffee beans can be selectively fed by gravity to the grinder mechanism from either of two hoppers. Separate reciprocable slides close off or open separate discharge openings communicating between the bottom of each hopper and the grinder inlet for beans. The slides are operated by separate solenoids. An electrical control circuit including a dual timer, two solenoids and the grinder motor, allow an operator to selectively grind a predetermined quantity of beans from either of the hoppers.

7 Claims, 3 Drawing Sheets

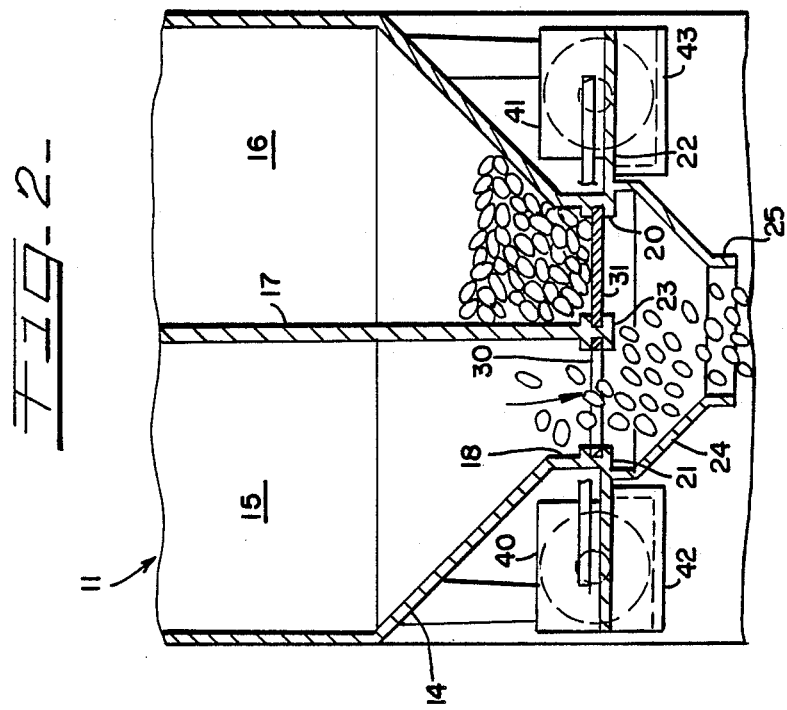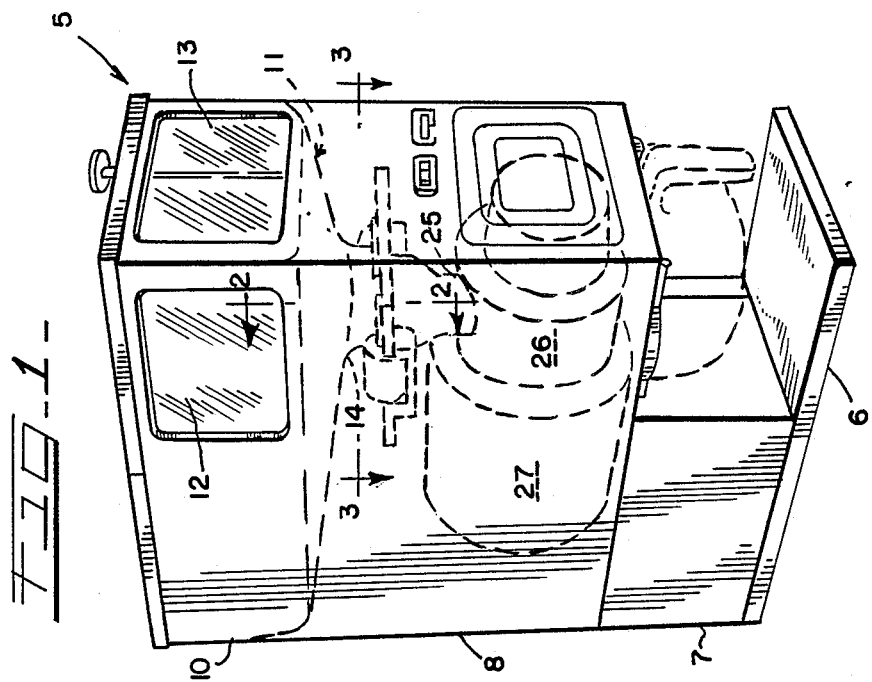

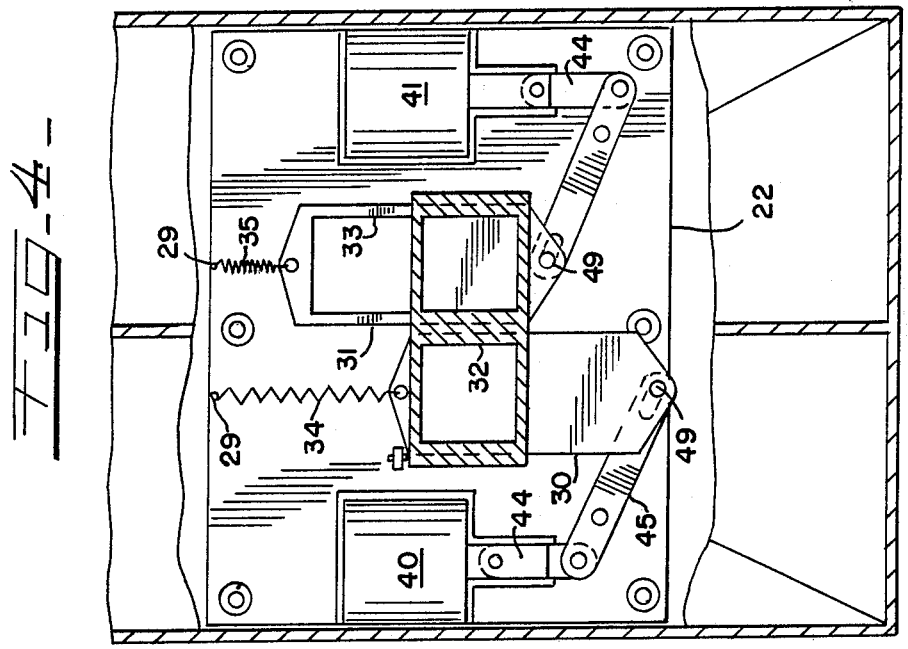
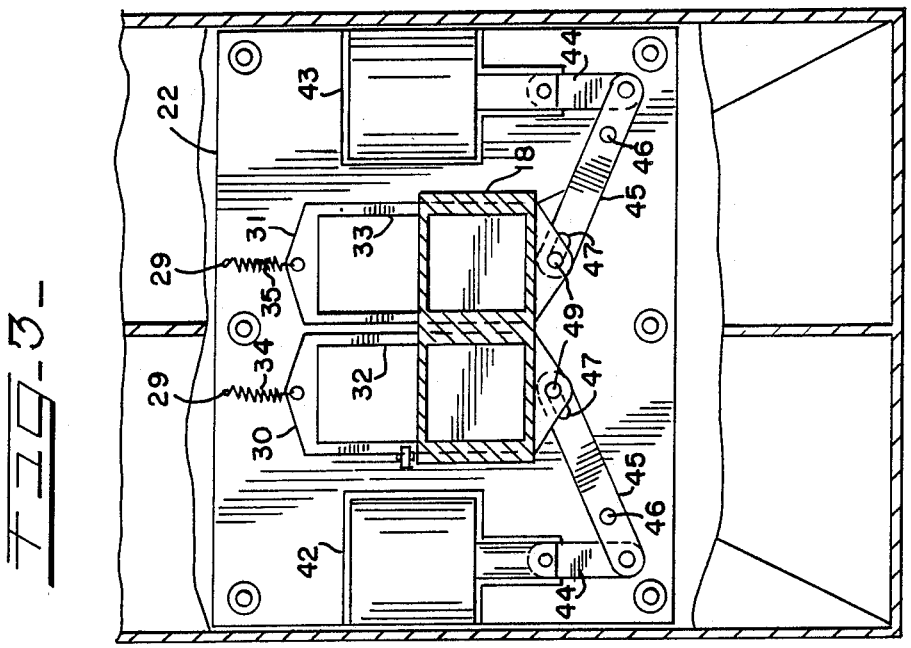

DUAL HOPPER COFFEE GRINDER

This invention relates generally to innovations and improvements in coffee grinders of the type that are equipped with hoppers holding quantities of coffee beans sufficient to provide ground coffee for multiple batches of ground coffee and which are timer-controlled so as to permit selection of the size(s) of each batch or batches. More particularly, the invention relates to such coffee grinders wherein the supply hoppers for the beans are divided into separate hoppers or chambers whereby not only the size of a batch of fresh ground coffee may be selected but also a selection can be made as between which of two types of beans will be ground to form a batch.

U.S. Pat. No. 4,607,200 dated Aug. 19, 1986 to John D. Zimmerman and assigned to Bunn-O-Matic Corporation discloses a timer-controlled coffee grinder of the above-mentioned general type to which the present invention relates wherein a supply hopper for the coffee beans comprises only a single compartment. The disclosure of U.S. Pat. No. 4,607,200 is hereby incorporated by reference since the dual hopper coffee grinders of the present incorporate a number of features disclosed in and common to the timer-controlled coffee grinder disclosed in U.S. Pat. No. 4,607,200.

The dual hopper coffee grinder of the present invention is particularly suited for use in association with coffee brewing machines of the type found in restaurants, institutions and offices wherein a substantial demand for both "regular" coffee and "decaffeinated" coffee. Since a single coffee grinder will suffice to serve the requirements for several coffee making machines, a need has existed for a coffee grinder which can be used to grind batches of ground coffee of two different kinds, particularly one kind being from regular coffee beans of a desired variety and another kind being decaffeinated coffee beans of desired variety.

Accordingly, the object of the present invention generally stated is a provision of a dual hopper coffee grinder equipped with a dual hopper for containing supplies of two different types of coffee beans and capable of being operated to grind different size batches of ground coffee from either of the two types of coffee beans contained in the hoppers.

Certain other more specific objects of the invention will become apparent to those skilled in the art in view of the following detailed description of a presently preferred embodiment of the invention taken in conjunction with the accompanying drawings wherein:

FIG. 1 is a perspective view of a dual hopper coffee grinder forming one embodiment of the invention;

FIG. 2 is a fragmentary sectional view on enlarged scale taken on line 2—2 of FIG. 1;

FIG. 3 is a fragmentary sectional view partly in plan and on enlarged scale taken on line 3—3 of FIG. 1;

FIG. 4 is a view corresponding to FIG. 3 showing one of the two hoppers in communication with the grinder mechanism while the other hopper is closed off.

Figure 5:
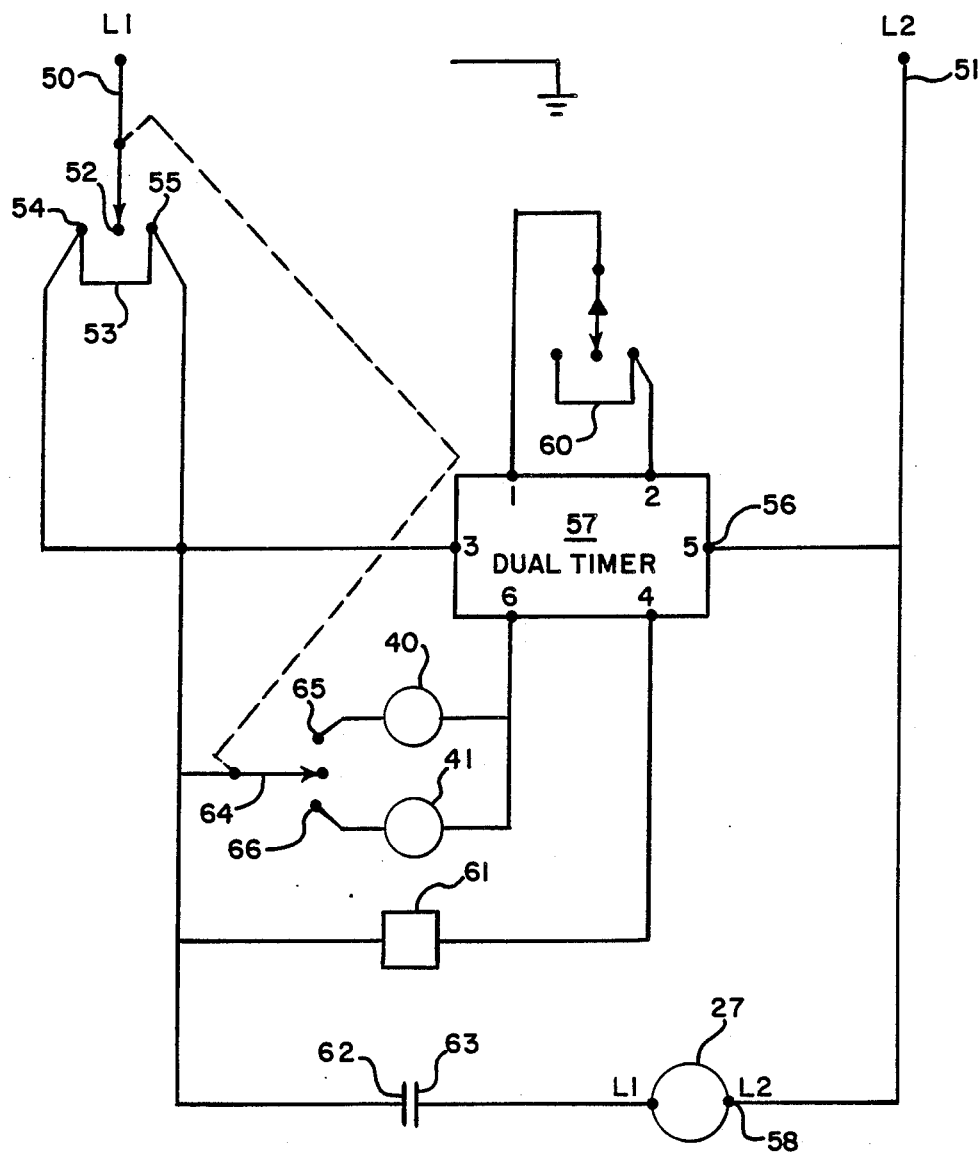
FIG. 5 is a schematic electrical circuit diagram for the dual hopper coffee grinder of FIGS. 1–4.

Referring to FIG. 1, a dual hopper coffee grinder is indicated generally at 5, the body of which includes a base plate 6 on which is mounted an enclosure comprising a pedestal section 7, a motor-grinder enclosure section 8 and a coffee bean hopper enclosure section 10.

A dual compartment or dual chamber hopper indicated generally at 11 is housed within the upper compartment enclosure 10. The enclosure 10 is provided with side windows 12—12 and a front window 13 which permit viewing the contents of the hopper 11 so that the adequacy of the supplies of beans therein can be readily estimated. It will be understood that the upper enclosure section 10 may itself provide the sidewalls and cover for the hopper 11 while the bottom 14 thereof is separately formed and attached.

The hopper 11 is divided fore-and-aft into two separate hoppers or compartments 15 and 16 by a vertical separator or baffle 17 as shown in FIG. 2. The bottom wall 14 of the hopper 11 slopes downwardly and inwardly toward the front of the grinder 5 and terminates in a rectangular bean discharge opening which is preferably rectangular in configuration and defined by the short neck or collar 18 (FIG. 2), the opposite front-to-rear sides of which have integrally formed horizontal guideways 20 and 21.

The opening 18 is surrounded on all four sides by a horizontal plate member 22 (FIGS. 2, 3 and 4) to which the bottom of the separater or divider 17 may be attached. The bottom edge of the separater 17 is provided with an integral I-section 23 (FIG. 2) having fore-and-aft extending grooves which provide opposing guideways for the previously mentioned guideways 20 and 21, respectively.

A funnel or chute 24 extends downwardly from the plate 22 under the opening 18 with its smaller bottom end 25 fitting in and communicating with the inlet opening in the top of the grinder 26 as shown in FIG. 1. The grinder 26 is driven directly by an electric motor 27.

It will be understood that the hopper section 10 and hopper 11, and its internal parts may be fabricated from sheet materials of various types including sheet metal, or plastics, or combinations thereof. The details of construction in this regard do not form part of the present invention.

From FIG. 2 it will be seen that the discharge opening 18 is divided by the separater or divider 17 into two separate discharge areas one being located at the bottom of compartment 15 and the other being located at the bottom of compartment 16. Each of these discharge opening areas is closed by a gate in the form of a slide. The slide for the opening under compartment 15 is indicated at 30 while the one for the opening at the bottom of compartment 16 is indicated at 31. These slides 30 and 31 are in the form of rectangular plates (FIGS. 3 and 4) with tapered front and rear ends and each having rectangular cut out window area 32 and 33 (FIG. 3), respectively.

Each of the slides 30 and 31 is reciprocally shiftable in a fore-and-aft direction in the guideways provided by the guideways 20 and 21 and the I-formation 23 at the bottom of the separater 17. Shifting movement and bias in a rearward direction is provided by tension springs 34 and 35, respectively. Each of these springs has one end thereof attached to its slide while the other end is anchored to a fixed pin 29 carried by the plate 22.

Shifting movement of the slides 30 and 31 in a forward or frontward direction is provided by solenoids 40 and 41 which sit in depressions or recesses 42 and 43 respectively provided therefore in the horizontal plate 22. The armature of each solenoid 40 and 41 is provided with a pivotally attached link 44 the outer end of which is pivotally attached to one end of a lever link 45. Each lever link 45 is pivotally mounted on a pin 46 upstanding from the plate 22. The inner end of each lever link 45 is slotted as indicated at 47 and pivotally connected by a pin 49 to the adjacent end of the respective slides 30 and 31.

In FIG. 3 each of the slides 30 and 31 is shown in its retracted and chute-closing position with the windows 32 and 33 thereof not under the discharge opening areas in the opening 18. The tension springs 34 and 35 move the slides 30 and 31 into their retracted positions shown in FIG. 3 when the solenoids 40 and 41 are not energized.

In FIG. 4 there is illustrated what happens when the solenoid 40 alone is energized thereby retracting the armature and link 44 and rotating the lever link 45 so as to draw the slide 30 forwardly against the force of the tension spring 34 and thereby bring the opening 32 in the slide 20 into registration with the area of the opening 18 which is at the bottom of the chamber 15. This allows the coffee beans to flow by gravity from the chamber 15 into the funnel 24 and then into the grinder 26 When the solenoid 40 is deenergized the tension spring 34 will retract the slide 30 to its closed position as shown in FIG. 3 and also retract the armature of solenoid 40. It will be understood that a reverse sequence occurs when solenoid 41 is energized and deenergized.

The control circuit for the dual hopper grinder 5 is shown diagrammatically in FIG. 5. The grinder motor 27 will be energized from a source of 120 volts alternating current (120 VAC/60 HZ) through a suitable connector cord (not shown) having a conventional three-prong connector plug on the end which is adapted to be inserted into a conventional three-socket receptacle. Two live conductors are indicated in FIG. 5 at 50 and 51. The conductor 50 is connected with the terminal 52 of a two-way Off-On switch 53 the other terminals of which are 54 and 55. The conductor 51 is connected with one terminal 56 of a dual timer 57 and also to one terminal 58 of the grinder motor 27.

In addition to the switch 53 and the dual timer 57 the control circuit also contains a Start switch 60 and a relay 61 which includes a coil which upon energization and deenergization closes and opens, respectively, a pair of contacts 62 and 63. The Off-On switch 53, Start switch 60, dual timer 57 and relay 61 are each and all of known, commercially available types.

The moving element of the two-way Off-On switch 53 is ganged as indicated to the moving element 64 of a two-way switch which includes contacts or terminals 65 and 66.

The manner in which the solenoids 40, 41, dual timer 57, relay 61 (with its contacts 62, 63) and motor 27 are interconnected in circuit relationship is readily apparent from FIG. 5. The switches 53 and 60 are manually operated by exposed buttons as shown in FIG. 1.

In operation, the button for switch 53 is movable from its intermediate Off position in one direction towards terminal 54 and in the opposite direction towards terminal 55. The switch 53 will be in the On position when either of the terminals 54 or 55 is in contact with the movable contact 52. When switch 53 is in the On position in one direction the movable element 64 will be in contact with one of the terminals 65 and 66 whereas, when switch 53 is in its opposition On position, the movable element 64 will be in contact with the other of terminals 65 and 66.

With the switch 53 being in either of its On positions, when the start switch 60 is closed it will be seen that all of the components of the circuit will be energized except that one of the solenoids 40 or 41 will not be energized. While the Off-On switch 53 is of the type that will remain in whichever of its three positions it occupies until manipulated further, the start switch 60 is of the type that once it is released it automatically opens by spring action. However, once the start switch 60 is momentarily closed, the timer 57 is energized and starts to "time out" for whatever time has been set for the grinder 26 to operate. When the preselected grinding time has expired, the dual timer 57 deenergizes the relay 61 and whichever of the solenoids 40 or 41 has been energized.

When a user wants to operate the grinder 5 again, the user will either leave the switch 53 in the particular On direction it is already in or move it to the opposite On position, depending on whichever type of coffee beans it is desired to grind. In addition, the user will set the dual timer 57 to the desired grinding time, and then actuate the Start switch 60. The above-described grinding cycle is again repeated with whichever of the solenoids 40 or 41 being actuated that corresponds to the particular type of coffee beans to be ground.

What is claimed is:

1. In a timer-controlled coffee grinder comprising a motor-grinding unit having a bean inlet opening in the top of the grinder and a ground coffee discharge opening in the bottom thereof, a coffee bean funnel having its bottom outlet opening disposed to discharge beans by gravity into said bean inlet opening, a coffee bean hopper having a bottom outlet opening disposed to discharge beans by gravity into the top of said funnel, means dividing the interior of said hopper into two side-by-side chambers and said hopper bottom outlet opening into separate side-by-side discharge areas with each area communicating with only the one of said chambers located above it, a separate slide for opening and closing each said discharge area, means for mounting each said slide for reciprocable movement between a first position closing its associated discharge area and a second position opening of said discharge area, separate reciprocating means including a solenoid for each said slide, means operatively interconnecting the armature of each said solenoid with one of said slides for shifting the same into at least one of its said opening or closing positions, and electrical control circuit means including a separate circuit for each said solenoid and including a timer whereby each slide may be selectively shifted from its closed position to its said area opening position in which it remains for a preselected time period after which it is automatically shifted back to its closed position.

2. In a timer-controlled coffee grinder as called for in claim 1, circuit means interfacing between said separate circuits whereby when one of said slides is in its discharge area opening position the remaining slide cannot also be in its discharge area opening position.

3. In a timer-controlled coffee grinder as called for in claim 1 wherein said chambers are of equal in size and shape and said discharge areas are substantially equal in size and of substantially the same shape.

4. In a timer-controlled coffee grinder as called for in claim 1, said slides being rectangular, and each said means for mounting each slide comprises a pair of parallel guideways in which opposing edges of each slidably fit.

5. In a timer-controlled coffee grinder as called for in claim 1, each said means operatively interconnecting the armature of each said solenoid with one of said slides is a linkage comprising a lever link pivoted intermediate its ends, and means pivotally interconnecting opposite ends of said lever link with said armature and said slide.

6. In a timer-controlled coffee grinder as called for in claim 5, each said operatively interconnected armature and slide reciprocating on parallel axes.

7. In a timer-controlled coffee grinder as called for in claim 1 wherein said electrical control circuit includes in addition to said motor and solenoids, a dual timer, a two-way Off-On switch, a momentary Starter switch, a relay having a pair of contacts, and a two-way switch whereby when manipulating said Starter switch when said two-way Off-On switch in is one of its On positions, said dual timer, relay, motor and one of said solenoids will be energized and remain energized until said dual timer times out.

* * * * *

REEXAMINATION CERTIFICATE (2857th)
United States Patent [19]
Nidiffer

[11] B1 4,971,259
[45] Certificate Issued Apr. 30, 1996

[54] DUAL HOPPER COFFEE GRINDER

[75] Inventor: Charles A. Nidiffer, Decatur, Ill.

[73] Assignee: Bunn-O-Matic Corporation, Springfield, Ill.

Reexamination Request:
No. 90/003,543, Aug. 22, 1994

Reexamination Certificate for:
| | |
|---|---|
| Patent No.: | 4,971,259 |
| Issued: | Nov. 20, 1990 |
| Appl. No.: | 61,724 |
| Filed: | Jun. 15, 1987 |

[51] Int. Cl.[6] .................................................. A47J 42/50
[52] U.S. Cl. .................................................. 241/34; 241/100
[58] Field of Search .................... 99/286; 241/34, 241/63, 64, 101.2, 224, 225, 101.6, 135, 186.2, 248

[56] References Cited

U.S. PATENT DOCUMENTS

D. 296,181  6/1988  Schaaf et al. .......................... D7/373
2,558,522  6/1951  Knapp .................................... 225/21
2,827,845  3/1958  Richeson ............................... 99/289

FOREIGN PATENT DOCUMENTS

| 436085 | 3/1912 | France ................................. 241/100 |
| 509864 | 10/1930 | Germany ............................ 241/100 |
| 3142348 | 5/1983 | Germany . |

*Primary Examiner*—Timothy V. Eley

[57] ABSTRACT

A coffee grinder in which coffee beans can be selectively fed by gravity to the grinder mechanism from either of two hoppers. Separate reciprocable slides close off or open separate discharge openings communicating between the bottom of each hopper and the grinder inlet for beans. The slides are operated by separate solenoids. An electrical control circuit including a dual timer, two solenoids and the grinder motor, allow an operator to selectively grind a predetermined quantity of beans from either of the hoppers.

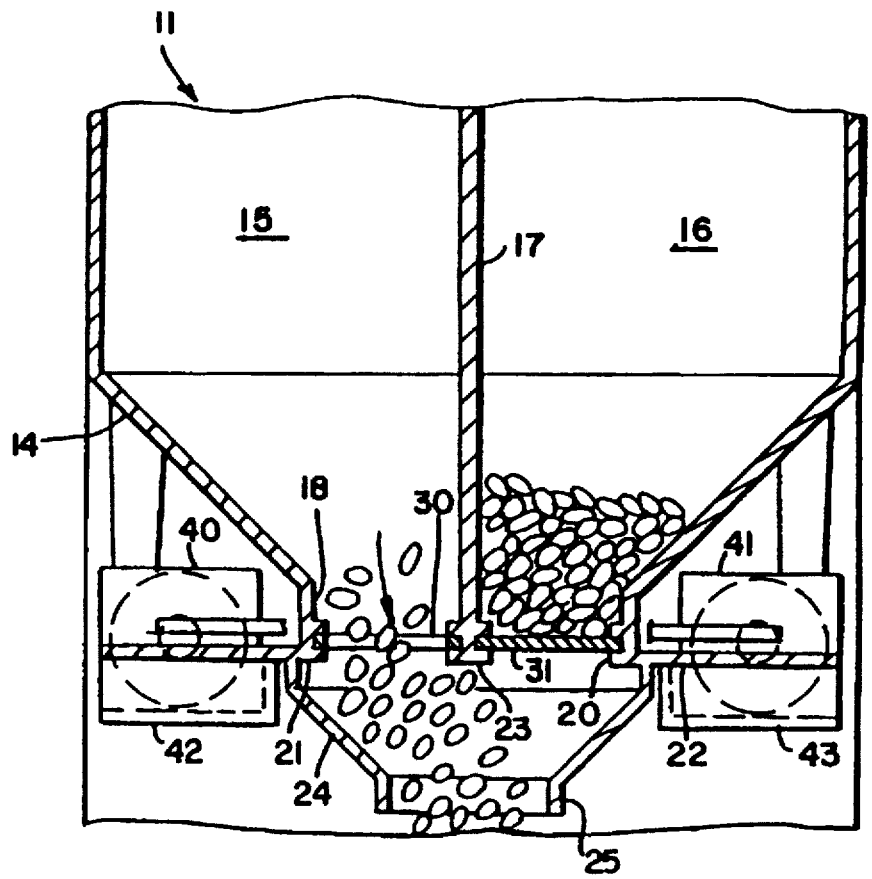

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1-7 is confirmed.

* * * * *